United States Patent
Nakagawa

3,938,884
Feb. 17, 1976

[54] LARGE APERTURE PHOTOGRAPHIC LENS SYSTEM

[75] Inventor: Jihei Nakagawa, Higashi-murayama, Japan

[73] Assignee: Olympus Optical Co., Ltd., Tokyo, Japan

[22] Filed: Feb. 13, 1975

[21] Appl. No.: 549,479

[30] Foreign Application Priority Data
Feb. 14, 1974  Japan .................. 49-17987

[52] U.S. Cl. .................. 350/215; 350/176
[51] Int. Cl.² .................. G02B 9/62
[58] Field of Search .................. 350/215, 176

[56] References Cited
UNITED STATES PATENTS

| | | |
|---|---|---|
| 3,012,476 | 12/1961 | Zimmermann et al. .......... 350/176 |
| 3,451,745 | 6/1969 | Kazamaki .......... 350/215 |
| 3,617,111 | 11/1971 | Kawazu .......... 350/176 |

*Primary Examiner*—Alfred E. Smith
*Assistant Examiner*—Conrad J. Clark
*Attorney, Agent, or Firm*—Cushman, Darby & Cushman

[57] ABSTRACT

A large aperture photographic lens system comprising six components of seven lenses wherein flare due to coma at intermediate field angles has been eliminated by so adapting as to satisfy the following conditions:

(1) $0.9 < r_{11}/r_9 < 1.05$ , $|r_9| > 0.55f$
(2) $0.95 < d_8/d_{10} < 1.25$
(3) $1 < r_5/r_4 < 1.3$
(4) $0.03f < d_4 < 0.05f$
(5) $n_1, n_2, n_5, n_6, n_7 > 1.75$

4 Claims, 10 Drawing Figures

SPHERICAL ABERRATION
1:1.2

−0.005 0 0.005

ASTIGMATISM
21.5°

−0.005 0 0.005

DISTORTION
21.5°

−5% 0 5%

SPHERICAL ABERRATION
1:1.2

ASTGMATISM
21.5°

DISTORTION
21.5°

SPHERICAL ABERRATION
1:1.2

ASTGMATISM
21.5°

DISTORTION
21.5°

LARGE APERTURE PHOTOGRAPHIC LENS SYSTEM

BACKGROUND OF THE INVENTION a. Field of the Invention

The present invention relates to a variant type of Gauss photographic lens with an aperture ratio of 1.2 and a field angle of about 43° which is intended for use with 35 mm single-lens reflex photographic cameras.

b. Description of the Prior Art

Conventional Gauss type lenses had a great defect that flare was produced due to coma at intermediate field angles.

SUMMARY OF THE INVENTION

A general object of the present invention is to provide a compact photographic lens system of the above-mentioned Gauss type wherein said flare due to coma is favourably corrected at intermediate field angles.

The photographic lens system according to the present invention comprises six components of seven lenses wherein the first component is a positive meniscus lens, the second component is a positive meniscus lens, the third component is a negative meniscus lens, the fourth component is a cemented doublet lens composed of a negative lens and a positive lens, the fifth component is a positive meniscus lens, a sixth component is a positive lens. The lens system according to the present invention satisfies the following conditions (1) $0.9 < r_{11}/r_9 < 1.05$, $|r_9| > 0.55f$
(2) $0.95 < d_8/d_{10} < 1.25$
(3) $1 < r_5/r_4 < 1.3$
(4) $0.03f < d_4 < 0.05f$
(5) $n_1, n_2, n_5, n_6, n_7 > 1.75$ wherein the reference symbols denote as defined below:

$f$: focal length of the entire lens system $r_4, r_5, r_9$ and $r_{11}$: radii of curvature of the image side surface of the second lens, the object side surface of the third lens, the image side surface of the fourth lens component and the image side surface of the fifth lens respectively.

$d_4$: air space between the second lens and the third lens $d_8$ and $d_{10}$: thicknesses of the image side lens of the fourth component and the fifth lens respectively $n_1, n_2, n_5, n_6$ and $n_7$: refractive indices of the first lens, the second lens, the image side lens of the fourth component, the fifth lens and the sixth lens respectively.

Now, the significance of the above-mentioned conditions will be described below:

When a large radius of curvature $|r_9|$ is selected for the image side surface of the fourth lens as defined in condition 1 on the assumption that the refractive power of the fourth component is kept at a constant value, it is possible to select a large value of $r_7$ as the radius of curvature for the object side surface of the fourth component. For reducing flare, it is effective to select such a large value of $|r_7|$. Further, the flare can be corrected more favourably by selecting small value of $|r_{11}|$ within the range specified by condition 1. If the value of $r_{11}/r_9$ is selected below the lower limit of condition 1, spherical aberration can hardly be corrected. When, on the other hand, the value of $r_{11}/r_9$ exceeds the upper limit of condition 1, it is impossible to obtain sufficient effect for correcting flare.

According to condition 2, a small value of $d_8$ is selected as the thickness of the image side lens of the fourth component, while a large value of $d_{10}$ is adopted as the thickness of the fifth lens. This measure serves for further enhancing the above-described effect of condition 1. If the value of $d_8/d_{10}$ is below the lower limit of condition 2, spherical aberration will be aggravated. When, on the other hand, the value of $d_8/d_{10}$ exceeds the upper limit of condition 2, it will be impossible to correct flare to a sufficient degree.

Condition 3, which can exhibit sufficient effect in combination with condition 4, is required for favourably correcting coma and astigmatism. If the value of $r_5/r_4$ is selected below the lower limit of condition 3, spherical aberration can not be corrected to a sufficient degree. When, on the other hand, the value of $r_5/r_4$ exceeds the upper limit of condition 3, coma will be aggravated and curvature of field can not be corrected sufficiently.

Condition 4 which has been adopted in combination with condition 3 as is already described above is required for selecting relatively large value of $d_4$ as the air space between the second lens and the third lens for the purpose of enhancing the correcting effect obtained by condition 3. Hence, it will be impossible to obtain sufficient correcting effect for coma and astigmatism if the value of $d_4$ is selected below the lower limit of this condition. When, in contrast; the value of $d_4$ exceeds the upper limit of condition 4, lateral chromatic aberration will be aggravated to an undesirable degree.

Finally, condition 5 is necessary both for favourably correcting spherical aberration and for minimizing Petzval's sum. In contrast to the fact that the above-mentioned conditions 1 through 4 are required with a view to correcting aberrations for offaxial rays, condition 5 is necessary for favourably correcting aberrations for paraxial rays and minimizing Petzval's sum. Therefore, these effects will not be obtained if the refractive indices of respective lenses are selected outside the range defined by condition 5. When glass with high refractive index is used as material of the first and second lenses in order to satisfy condition 1, it is impossible to design these lenses so as to have large Abbe's numbers. In order to favourably correct lateral chromatic aberration under such a restriction, it is required to design the image side lens of the fourth component, fifth lens and sixth lens in such a manner that they have Abbe's numbers $\nu_5$, $\nu_6$ and $\nu_7$ which are close to Abbe's numbers $\nu_1$ and $\nu_2$ of the first and second lenses. In view of this requirement, it is preferable to select these Abbe's numbers within the range of $\nu_1, \nu_2, \nu_5, \nu_6$ and $\nu_7 < 50$.

DETAILED DESCRIPTION OF THE PREFERRED EMBODIMENTS

Figure 1:
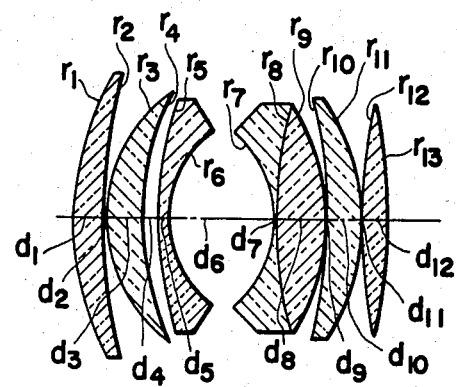
FIG. 1 is a sectional view illustrating the composition of a large aperture lens system according to the present invention.
Figure 2A:
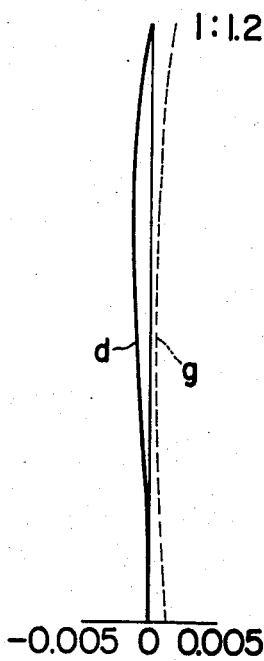
FIG. 2A through FIG. 2C illustrate curves showing the aberration characteristic of the embodiment 1.
Figure 2B:
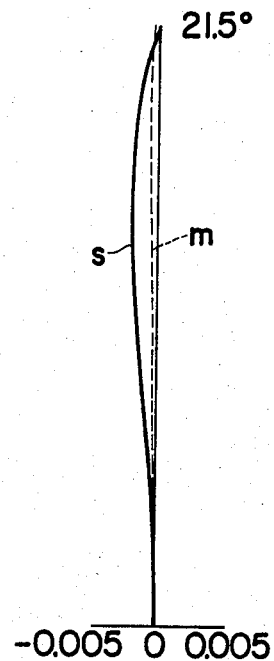
Figure 2C:
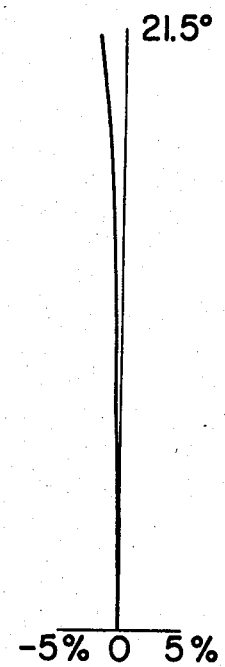
Figure 3A:
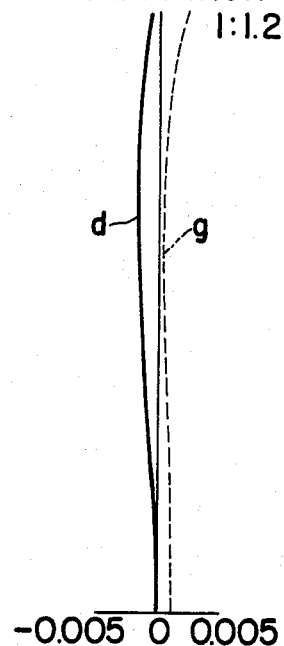
FIG. 3A through FIG. 3C show graphs illustrating the aberration characteristic of the embodiment 2.
Figure 3B:
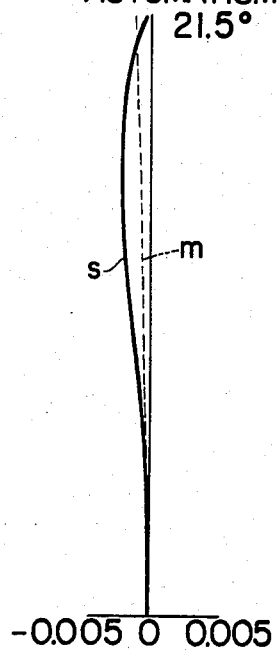
Figure 3C:
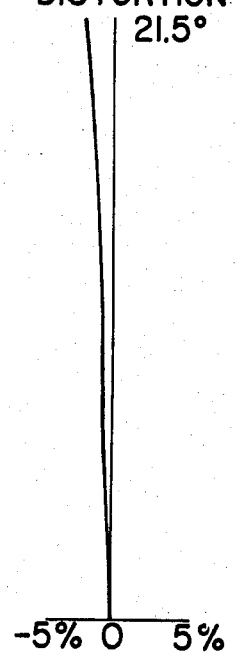
Figure 4A:
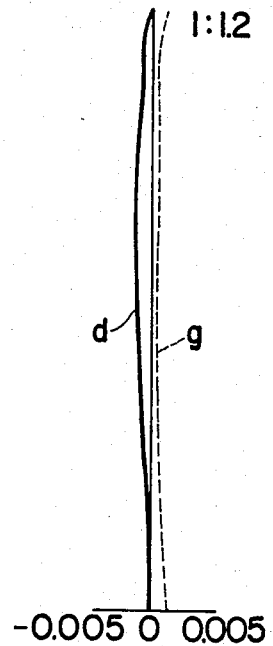
FIG. 4A through FIG. 4C show graphs illustrating the aberration characteristic of the embodiment 3.
Figure 4B:
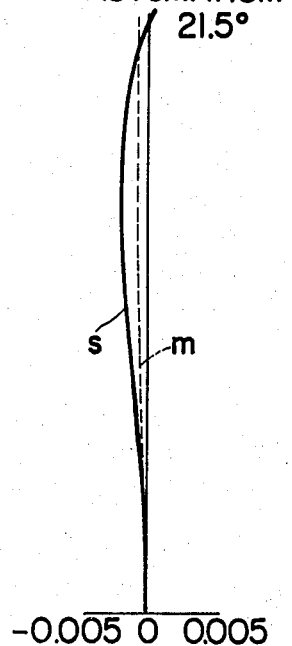
Figure 4C:
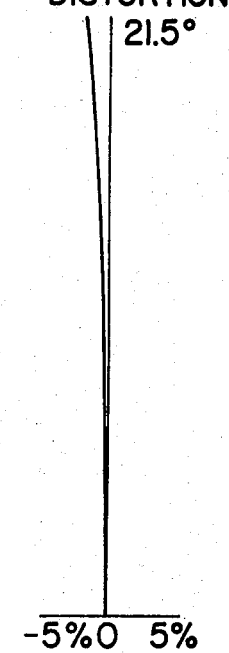

Now, some numerical data of the lens system according to the present invention will be exemplified below:

Embodiment 1

$f = 1.0$, $\quad f_B = 0.7066$, $\quad F/1.2$

| | | |
|---|---|---|
| $r_1 = 0.8731$ | | |
| $d_1 = 1.034$ | $n_1 = 1.8061$ | $\nu_1 = 40.9$ |
| $r_2 = 3.5977$ | | |
| $d_2 = 0.0023$ | | |
| $r_3 = 0.4580$ | | |
| $d_3 = 0.0982$ | $n_2 = 1.8061$ | $\nu_2 = 40.9$ |
| $r_4 = 0.7210$ | | |
| $d_4 = 0.0454$ | | |
| $r_5 = 0.8444$ | | |
| $d_5 = 0.0268$ | $n_3 = 1.7847$ | $\nu_3 = 26.2$ |
| $r_6 = 0.3054$ | | |
| $d_6 = 0.3200$ | | |
| $r_7 = -0.3510$ | | |
| $d_7 = 0.0268$ | $n_4 = 1.78472$ | $\nu_4 = 25.7$ |
| $r_8 = 3.2095$ | | |
| $d_8 = 0.1327$ | $n_5 = 1.79952$ | $\nu_5 = 42.2$ |
| $r_9 = -0.6036$ | | |
| $d_9 = 0.0018$ | | |
| $r_{10} = -2.3687$ | | |
| $d_{10} = 0.1107$ | $n_6 = 1.79952$ | $\nu_6 = 42.2$ |
| $r_{11} = -0.6074$ | | |
| $d_{11} = 0.0023$ | | |
| $r_{12} = 1.9981$ | | |
| $d_{12} = 0.0504$ | $n_7 = 1.7859$ | $\nu_7 = 44.2$ |
| $r_{13} = -5.2395$ | | |

Embodiment 2

$f = 1$, $\quad f_B = 0.6910$, $\quad F/1.2$

| | | |
|---|---|---|
| $r_1 = 0.8135$ | | |
| $d_1 = 0.0887$ | $n_1 = 1.8061$ | $\nu_1 = 40.9$ |
| $r_2 = 2.8782$ | | |
| $d_2 = 0.0023$ | | |
| $r_3 = 0.4419$ | | |
| $d_3 = 0.1071$ | $n_2 = 1.8061$ | $\nu_2 = 40.9$ |
| $r_4 = 0.6246$ | | |
| $d_4 = 0.0339$ | | |
| $r_5 = 0.6965$ | | |
| $d_5 = 0.0268$ | $n_3 = 1.78472$ | $\nu_3 = 25.7$ |
| $r_6 = 0.2948$ | | |
| $d_6 = 0.3262$ | | |
| $r_7 = -0.3460$ | | |
| $d_7 = 0.0268$ | $n_4 = 1.78472$ | $\nu_4 = 25.7$ |
| $r_8 = 2.6761$ | | |
| $d_8 = 0.1178$ | $n_5 = 1.8061$ | $\nu_5 = 40.9$ |
| $r_9 = -0.6001$ | | |
| $d_9 = 0.0018$ | | |
| $r_{10} = -1.6420$ | | |
| $d_{10} = 0.1184$ | $n_6 = 1.7859$ | $\nu_6 = 44.2$ |
| $r_{11} = -0.5630$ | | |
| $d_{11} = 0.0023$ | | |
| $r_{12} = 1.7856$ | | |
| $d_{12} = 0.0513$ | $n_7 = 1.79952$ | $\nu_7 = 42.2$ |
| $r_{13} = -5.3612$ | | |

Embodiment 3

$f = 1$, $\quad f_B = 0.6912$, $\quad F/1.2$

| | | |
|---|---|---|
| $r_1 = 0.8267$ | | |
| $d_1 = 0.0888$ | $n_1 = 1.8061$ | $\nu_1 = 40.9$ |
| $r_2 = 3.4012$ | | |
| $d_2 = 0.0023$ | | |
| $r_3 = 0.4529$ | | |
| $d_3 = 0.1072$ | $n_2 = 1.8061$ | $\nu_2 = 40.9$ |
| $r_4 = 0.7059$ | | |
| $d_4 = 0.0341$ | | |
| $r_5 = 0.8472$ | | |
| $d_5 = 0.0268$ | $n_3 = 1.78472$ | $\nu_3 = 25.7$ |
| $r_6 = 0.3014$ | | |
| $d_6 = 0.3211$ | | |
| $r_7 = -0.3541$ | | |
| $d_7 = 0.0268$ | $n_4 = 1.78472$ | $\nu_4 = 25.7$ |
| $r_8 = 6.4741$ | | |
| $d_8 = 0.1179$ | $n_5 = 1.8061$ | $\nu_5 = 40.9$ |
| $r_9 = -0.6131$ | | |
| $d_9 = 0.0019$ | | |
| $r_{10} = -1.7444$ | | |
| $d_{10} = 0.1184$ | $n_6 = 1.7859$ | $\nu_6 = 44.2$ |
| $r_{11} = -0.5707$ | | |
| $d_{11} = 0.0023$ | | |
| $r_{12} = 1.8066$ | | |
| $d_{12} = 0.0513$ | $n_7 = 1.79952$ | $\nu_7 = 42.2$ |
| $r_{13} = -5.3646$ | | | wherein reference symbols $r_1$ through $r_{13}$ represent radii of curvature of respective lens surfaces, $d_1$ through $d_{12}$ denote thicknesses of respective lenses and distances between respective lenses, $n_1$ through $n_7$ indicate refractive indices of the lenses and $\nu_1$ through $\nu_7$ designate Abbe's number. Seidel's coefficients of the above-mentioned embodiments will be listed below:

Embodiment 1

|   | B | F | C | P | E |
|---|---|---|---|---|---|
| 1 | 0.3713 | 0.0924 | 0.0230 | 0.5112 | 0.1329 |
| 2 | 0.0813 | −0.2375 | 0.6939 | −0.1241 | −1.6650 |
| 3 | 0.0296 | 0.0065 | 0.0014 | 0.9745 | 0.2148 |
| 4 | 0.0654 | −0.2745 | 1.1533 | −0.6190 | −2.2444 |
| 5 | −0.1940 | 0.5314 | −1.4553 | 0.5207 | 2.5594 |
| 6 | −1.0751 | −0.3186 | −0.0944 | −1.4397 | −0.4547 |
| 7 | −1.7189 | −0.7705 | −0.3454 | −1.2527 | 0.7163 |
| 8 | 0.0081 | 0.0120 | 0.0179 | 0.0014 | 0.0288 |
| 9 | 0.1664 | −0.1318 | 0.1043 | 0.7361 | −0.6655 |
| 10 | 0.0002 | −0.0013 | 0.0094 | −0.1876 | 1.2830 |
| 11 | 1.7270 | −0.1622 | 0.0152 | 0.7315 | −0.0701 |
| 12 | −0.0138 | 0.0692 | −0.3479 | 0.2202 | 0.6417 |
| 13 | 0.6545 | −0.3469 | 0.1839 | 0.0840 | −0.1420 |
| Σ | 0.1018 | 0.0091 | −0.0406 | 0.1566 | 0.3353 |

Embodiment 2

|   | B | F | C | P | E |
|---|---|---|---|---|---|
| 1 | 0.4590 | 0.0928 | 0.0188 | 0.5486 | 0.1147 |
| 2 | 0.0621 | −0.2005 | 0.6472 | −0.1551 | −1.5886 |
| 3 | 0.0553 | 0.0101 | 0.0018 | 1.0100 | 0.1842 |
| 4 | 0.0093 | −0.0924 | 0.9149 | −0.7146 | −1.9835 |
| 5 | −0.0595 | 0.2611 | −1.1450 | 0.6313 | 2.2526 |
| 6 | −1.0937 | −0.2974 | −0.0809 | −1.4829 | −0.4252 |
| 7 | −1.8167 | 0.7881 | −0.3419 | −1.2708 | 0.6996 |
| 8 | 0.0113 | 0.0172 | 0.0262 | 0.0025 | 0.0439 |
| 9 | 0.1706 | −0.1427 | 0.1194 | 0.7437 | −0.7219 |
| 10 | −0.0034 | 0.0130 | −0.0499 | −0.2680 | 1.2212 |
| 11 | 1.7282 | −0.1288 | 0.0096 | 0.7816 | −0.0590 |
| 12 | −0.0073 | 0.0508 | −0.3538 | 0.2488 | 0.7317 |
| 13 | 0.6841 | −0.3440 | 0.1866 | 0.0829 | −0.1462 |
| Σ | 0.1495 | 0.0272 | −0.0469 | 0.1581 | 0.3234 |

Embodiment 3

|   | B | F | C | P | E |
|---|---|---|---|---|---|
| 1 | 0.4374 | 0.0966 | 0.0213 | 0.5399 | 0.1240 |
| 2 | 0.0946 | −0.2639 | 0.7367 | −0.1312 | −1.6900 |
| 3 | −0.0020 | −0.0005 | −0.0001 | 0.9855 | 0.2251 |
| 4 | 0.0899 | −0.3364 | 1.2582 | −0.6323 | −2.3414 |
| 5 | −0.2478 | 0.6243 | −1.5725 | 0.5190 | 2.6536 |
| 6 | − | −0.3068 | −0.0885 | −1.4588 | −0.4462 |
|   | 1.0637 |   |   |   |   |
| 7 | −1.7187 | 0.7783 | −0.3525 | −1.2417 | 0.7219 |
| 8 | 0.0070 | 0.0122 | 0.0212 | 0.0010 | 0.0386 |
| 9 | 0.1541 | −0.1349 | 0.1182 | 0.7280 | −0.7411 |
| 10 | −0.0019 | 0.0081 | −0.0351 | −0.2523 | 1.2398 |
| 11 | 1.7167 | −0.1525 | 0.0136 | 0.7711 | −0.0697 |
| 12 | −0.0073 | 0.0506 | −0.3512 | 0.2459 | 0.7310 |
| 13 | 0.6365 | −0.3507 | 0.1932 | 0.0828 | −0.1521 |
| Σ | 0.0948 | 0.0245 | −0.0375 | 0.1569 | 0.2935 |

B: spherical aberration
F: Coma
C: astigmatism
P: Petzval's sum
E: distortion

As is clearly understood from the foregoing descriptions, the present invention provides a compact lens system for photographic cameras which has high aperture ratio and which is capable of correcting aberrations very effectively.

I claim:

1. A large aperture photographic lens system comprising a first positive meniscus lens, a second positive meniscus lens, a third negative meniscus lens, a fourth cemented doublet lens component consisting of a negative lens and a positive lens, a fifth positive meniscus lens and sixth positive lens, and said large aperture photographic lens system satisfying the following conditions:

(1) $0.9 < r_{11}/r_9 < 1.05$ , $|r_9| > 0.55f$
(2) $0.95 < d_8/d_{10} < 1.25$
(3) $1 < r_5/r_4 < 1.3$
(4) $0.03f < d_4 < 0.05f$
(5) $n_1, n_2, n_5, n_6, n_7 > 1.75$ wherein reference symbol $f$ represents the focal length of the entire lens system, reference symbols $r_4, r_5, r_9$ and $r_{11}$ represent respective radii of curvature of the image side surface of said second lens, the object side surface of said third lens, the image side surface of said fourth component and the image side surface of said fifth lens, reference symbol $d_4$ represents the air space between the second lens and the third lens, reference symbols $d_8$ and $d_{10}$ represent respective thicknesses of the image side lens of said fourth component and the fifth lens and reference symbols $n_1$, $n_2$, $n_5$, $n_6$ and $n_7$ represent respective refractive indices of said first lens, said second lens, the image side lens of said fourth component, said fifth lens and said sixth lens.

2. A large aperture photographic lens system comprising a first positive meniscus lens, a second positive meniscus lens, a third negative meniscus lens, a fourth cemented doublet lens component consisting of a negative lens and a positive lens, a fifth positive meniscus lens and sixth positive lens, and said large aperture photographic lens system having the following numerical data:

$f = 1.0$ , $f_B = 0.7066$ , F/1.2
$r_1 = 0.8731$
$d_1 = 1.034$    $n_1 = 1.8061$    $\nu_1 = 40.9$
$r_2 = 3.5977$
$d_2 = 0.0023$
$r_3 = 0.4580$
$d_3 = 0.0982$    $n_2 = 1.8061$    $\nu_2 = 40.9$
$r_4 = 0.7210$
$d_4 = 0.0454$
$r_5 = 0.8444$
$d_5 = 0.0268$    $n_3 = 1.7847$    $\nu_3 = 26.2$
$r_6 = 0.3054$
$d_6 = 0.3200$
$r_7 = -0.3510$
$d_7 = 0.0268$    $n_4 = 1.78472$   $\nu_4 = 25.7$
$r_8 = 3.2095$
$d_8 = 0.1327$    $n_5 = 1.79952$   $\nu_5 = 42.2$
$r_9 = -0.6036$
$d_9 = 0.0018$
$r_{10} = -2.3687$
$d_{10} = 0.1107$  $n_6 = 1.79952$   $\nu_6 = 42.2$
$r_{11} = -0.6074$
$d_{11} = 0.0023$
$r_{12} = 1.9981$
$d_{12} = 0.0504$  $n_7 = 1.7859$    $\nu_7 = 44.2$
$r_{13} = -5.2395$ wherein reference symbols $r_1$ through $r_{13}$ represent radii of curvature of respective lens surfaces, $d_1$ through $d_{12}$ denote thicknesses of respective lenses and distances between respective lenses, $n_1$ through $n_7$ indicate refractive indices of the lenses and $\nu_1$ through $\nu_7$ designate Abbe's number.

3. A large aperture photographic lens system comprising a first positive meniscus lens, a second positive meniscus lens, a third negative meniscus lens, a fourth cemented doublet lens component consisting of a negative lens and a positive lens, a fifth positive meniscus lens and sixth positive lens, and said large aperture photographic lens system having the following numerical data:

$f = 1$, $f_B = 0.6910$, F/1.2

| | | |
|---|---|---|
| $r_1 = 0.8135$ | | |
| $d_1 = 0.0887$ | $n_1 = 1.8061$ | $\nu_1 = 40.9$ |
| $r_2 = 2.8782$ | | |
| $d_2 = 0.0023$ | | |
| $r_3 = 0.4419$ | | |
| $d_3 = 0.1071$ | $n_2 = 1.8061$ | $\nu_2 = 40.9$ |
| $r_4 = 0.6246$ | | |
| $d_4 = 0.0339$ | | |
| $r_5 = 0.6965$ | | |
| $d_5 = 0.0268$ | $n_3 = 1.78472$ | $\nu_3 = 25.7$ |
| $r_6 = 0.2948$ | | |
| $d_6 = 0.3262$ | | |
| $r_7 = -0.3460$ | | |
| $d_7 = 0.0268$ | $n_4 = 1.78472$ | $\nu_4 = 25.7$ |
| $r_8 = 2.6761$ | | |
| $d_8 = 0.1178$ | $n_5 = 1.8061$ | $\nu_5 = 40.9$ |
| $r_9 = -0.6001$ | | |
| $d_9 = 0.0018$ | | |
| $r_{10} = -1.6420$ | | |
| $d_{10} = 0.1184$ | $n_6 = 1.7859$ | $\nu_6 = 44.2$ |
| $r_{11} = -0.5630$ | | |
| $d_{11} = 0.0023$ | | |
| $r_{12} = 1.7856$ | | |
| $d_{12} = 0.0513$ | $n_7 = 1.79952$ | $\nu_7 = 42.2$ |
| $r_{13} = -5.3612$ | | | wherein reference symbols $r_1$ through $r_{13}$ represent radii of curvature of respective lens surfaces, $d_1$ through $d_{12}$ denote thicknesses of respective lenses and distances between respective lenses, $n_1$ through $n_7$ indicate refractive indices of the lenses and $\nu_1$ through $\nu_7$ designate Abbe's number.

4. A large aperture photographic lens system comprising a first positive meniscus lens, a second positive meniscus lens, a third negative meniscus lens, a fourth cemented doublet lens component consisting of a negative lens and a positive lens, a fifth positive meniscus lens and sixth positive lens, and said large aperture photographic lens system having the following numerical data:

$f = 1$, $f_B = 0.6912$, F/1.2

| | | |
|---|---|---|
| $r_1 = 0.8267$ | | |
| $d_1 = 0.0888$ | $n_1 = 1.8061$ | $\nu_1 = 40.9$ |
| $r_2 = 3.4012$ | | |
| $d_2 = 0.0023$ | | |
| $r_3 = 0.4529$ | | |
| $d_3 = 0.1072$ | $n_2 = 1.8061$ | $\nu_2 = 40.9$ |
| $r_4 = 0.7059$ | | |
| $d_4 = 0.0341$ | | |
| $r_5 = 0.8472$ | | |
| $d_5 = 0.0268$ | $n_3 = 1.78472$ | $\nu_3 = 25.7$ |
| $r_6 = 0.3014$ | | |
| $d_6 = 0.3211$ | | |
| $r_7 = -0.3541$ | | |
| $d_7 = 0.0268$ | $n_4 = 1.78472$ | $\nu_4 = 25.7$ |
| $r_8 = 6.4741$ | | |
| $d_8 = 0.1179$ | $n_5 = 1.8061$ | $\nu_5 = 40.9$ |
| $r_9 = -0.6131$ | | |
| $d_9 = 0.0019$ | | |
| $r_{10} = -1.7444$ | | |
| $d_{10} = 0.1184$ | $n_6 = 1.7859$ | $\nu_6 = 44.2$ |
| $r_{11} = -0.5707$ | | |
| $d_{11} = 0.0023$ | | |
| $r_{12} = 1.8066$ | | |
| $d_{12} = 0.0513$ | $n_7 = 1.79952$ | $\nu_7 = 42.2$ |
| $r_{13} = -5.3646$ | | | wherein reference symbols $r_1$ through $r_{13}$ represent radii of curvature of respective lens surfaces, $d_1$ through $d_{12}$ denote thicknesses of respective lenses and distances between respective lenses, $n_1$ through $n_7$ indicate refractive indices of the lenses and $\nu_1$ through $\nu_7$ designate Abbe's number.

* * * * *